(12) United States Patent
Sankhavaram et al.

(10) Patent No.: US 10,496,233 B2
(45) Date of Patent: Dec. 3, 2019

(54) TRACKING A STATUS OF A PROCESS

(71) Applicant: Hewlett Packard Enterprise Development LP, Houston, TX (US)

(72) Inventors: Vasu Sasikanth Sankhavaram, Sunnyvale, CA (US); Kevin Lee Wilson, Fort Collins, CO (US)

(73) Assignee: MICRO FOCUS LLC, Santa Clara, CA (US)

( * ) Notice: Subject to any disclaimer, the term of this patent is extended or adjusted under 35 U.S.C. 154(b) by 357 days.

(21) Appl. No.: 15/031,719

(22) PCT Filed: Oct. 23, 2013

(86) PCT No.: PCT/US2013/066417
§ 371 (c)(1),
(2) Date: Apr. 22, 2016

(87) PCT Pub. No.: WO2015/060844
PCT Pub. Date: Apr. 30, 2015

(65) Prior Publication Data
US 2016/0266728 A1    Sep. 15, 2016

(51) Int. Cl.
*G06F 3/0481* (2013.01)
*G06F 11/34* (2006.01)
*G06F 3/0485* (2013.01)
*G06Q 10/06* (2012.01)
*G06F 3/0484* (2013.01)
*G06F 9/46* (2006.01)
*G06F 11/32* (2006.01)
*G06F 16/00* (2019.01)

(52) U.S. Cl.
CPC .......... *G06F 3/0481* (2013.01); *G06F 3/0484* (2013.01); *G06F 3/0485* (2013.01); *G06F 9/46* (2013.01); *G06F 11/323* (2013.01); *G06F 11/34* (2013.01); *G06F 11/3404* (2013.01); *G06F 11/3409* (2013.01); *G06F 11/3476* (2013.01); *G06F 16/00* (2019.01); *G06Q 10/0633* (2013.01); *G06F 11/3452* (2013.01); *G06F 2201/81* (2013.01); *G06F 2201/865* (2013.01)

(58) Field of Classification Search
CPC .......... G06F 17/30; G06F 11/34; G06F 3/048; G06T 13/00
See application file for complete search history.

(56) References Cited

U.S. PATENT DOCUMENTS

| | | |
|---|---|---|
| 5,430,836 A | 7/1995 | Wolf et al. |
| 7,496,913 B2 | 10/2009 | Hayes et al. |
| 8,464,239 B2 | 6/2013 | Ferris et al. |
| 9,358,464 B1 * | 6/2016 | Johnson .................. A63F 13/12 |
| 9,396,088 B2 * | 7/2016 | Liang .................. G06F 11/3476 |

(Continued)

OTHER PUBLICATIONS

International Search Report & Written Opinion received in PCT Application No. PCT/US2013/066417, dated Jul. 17, 2014, 12 pages.

(Continued)

*Primary Examiner* — Rashawn N Tillery

(57) ABSTRACT

Tracking a status of a process includes displaying relationship(s) between process tasks of a process map in a user interface, visually indicating an actual completion rate of at least one of the tasks, and comparing the actual completion rate to an expected completion rate of the tasks.

15 Claims, 6 Drawing Sheets

900

Display a relationship between tasks within a process in a process map in a user interface — 902

Visually indicate an actual completion rate of at least one of the tasks — 904

Compare the actual completion rate to an expected completion rate of the at least one of the tasks — 906

(56) References Cited

U.S. PATENT DOCUMENTS

| | | | |
|---|---|---|---|
| 2004/0207662 A1* | 10/2004 | Anderson | G06T 17/20 715/772 |
| 2005/0234758 A1* | 10/2005 | Nishi | G06Q 10/06 705/80 |
| 2006/0253548 A1 | 11/2006 | Vitanov et al. | |
| 2007/0067196 A1* | 3/2007 | Usui | G06Q 10/06 705/7.12 |
| 2008/0115143 A1* | 5/2008 | Shimizu | G06F 9/5066 718/105 |
| 2008/0163124 A1* | 7/2008 | Bonev | G06F 9/451 715/853 |
| 2009/0125359 A1* | 5/2009 | Knapic | G06F 9/542 705/7.23 |
| 2009/0222483 A1* | 9/2009 | Johnson | G06F 8/60 |
| 2010/0151846 A1* | 6/2010 | Vuong | H04M 1/0245 455/418 |
| 2010/0281241 A1* | 11/2010 | El-Nakhily | G06Q 10/06 712/234 |
| 2011/0271220 A1* | 11/2011 | Remsberg | G06Q 10/06 715/772 |
| 2011/0283292 A1 | 11/2011 | Saffre | |
| 2011/0307865 A1 | 12/2011 | Grieves et al. | |
| 2012/0079408 A1* | 3/2012 | Rohwer | G06Q 10/06 715/772 |
| 2012/0144364 A1 | 6/2012 | Lau et al. | |
| 2013/0120166 A1 | 5/2013 | Kommori et al. | |
| 2013/0235044 A1* | 9/2013 | Kaleta | G06F 3/0484 345/473 |
| 2014/0047115 A1* | 2/2014 | Lipscomb | G06F 9/485 709/226 |
| 2014/0130036 A1* | 5/2014 | Gurikar | G06F 8/61 717/176 |
| 2015/0121398 A1* | 4/2015 | Li | G06F 9/542 719/318 |

OTHER PUBLICATIONS

Schumm, D. et al., "Applicability of Process Viewing Patterns Business Process Management," Enterprise Distributed Object Computing Conference Workshops (EDOCW) Oct. 25, 2010 14th IEEE International pp. 79-88.

Wongsuphasawat, K. et al., "Exploring Flow, Factors, and Outcomes of Temporal Sequences with the Outflow Visualization," Visualization and Compuer Graphics, IEEE Transactions on 18 Dec. 12, 2012 pp. 2659-2668.

IBM; "Application Health Workspace"; http://publib.boulder.ibm.com/infocenter/tivihelp/v63r1/index.jsp?topic=%2Fcom.ibm.itcamfapps_ad.doc_72%2Fitcam_71_was_tema_help%2Fwksp_kyn_aphlth.html; downloaded on Oct. 2, 2013; 2 pages.

\* cited by examiner

TRACKING A STATUS OF A PROCESS

BACKGROUND

Data centers provide the capability of performing large scale automated deployment. Such automated deployment often includes multiple tasks. Some of these tasks can be performed sequentially while other tasks can be performed in parallel. Log messaging can be used to track the status of the execution of the tasks in the deployment.

BRIEF DESCRIPTION OF THE DRAWINGS

The accompanying drawings illustrate various examples of the principles described herein and are a part of the specification. The illustrated examples are merely examples and do not limit the scope of the claims.

DETAILED DESCRIPTION

While log messaging has been implemented to track the execution of such large scale automated deployments, the principles described herein provide a visual depiction of the status of each of the tasks as they are performed. As a result, the user can intuitively understand what is happening throughout the process. Further, the principles described herein can also indicate where failures are occurring. This provides the user with an ability to select options that reflect the true issues that are occurring during the process instead of relying on messages that lack the level of detail that may be visual communicated with the principles described herein.

The principles described herein include a method that tracks a status of a process. Such a method includes displaying a relationship between tasks within a process in a process map in a user interface, visually indicating an actual completion rate of at least one of the tasks, and comparing the actual completion rate to an expected completion rate of the tasks. Any appropriate type of process may be depicted in the process map. For example, deploying applications, business processes, manufacturing processes, automated processes, workflows processes, other types of processes, or combinations thereof may be depicted in the process map.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described is included in at least that one example, but not necessarily in other examples.

Figure 1:
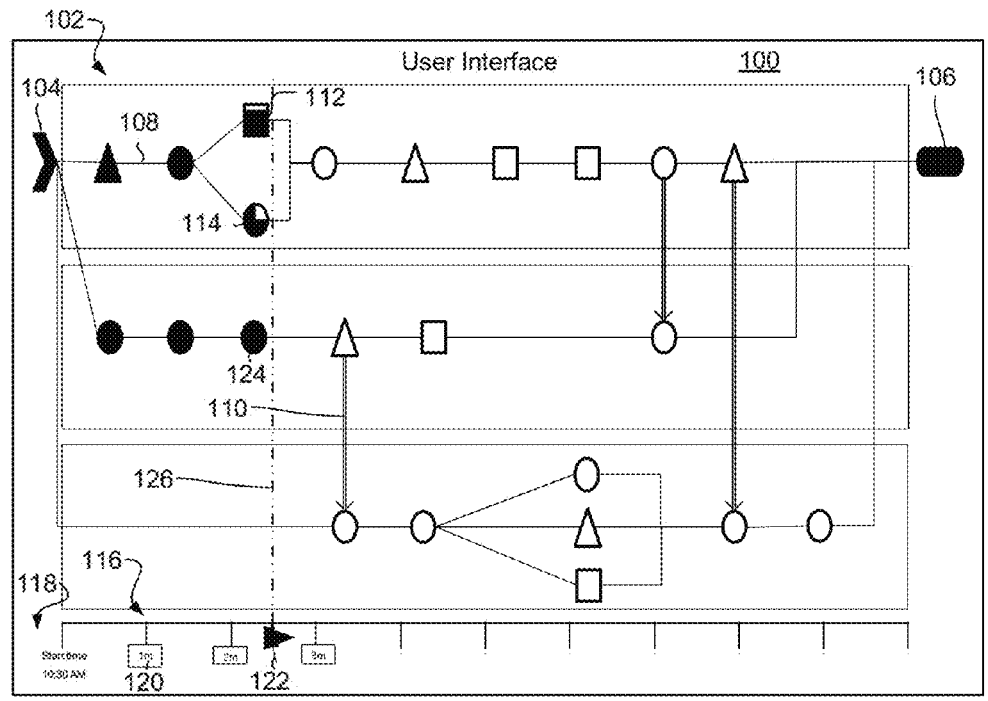
FIG. 1 is a diagram of an example of a user interface displaying a process map according to the principles described herein.

FIG. 1 is a diagram of an example of a user interface (100) displaying a process map (102) according to the principles described herein. In this example, the process map (102) includes a starting point (104) and an ending point (106). At the starting point (104), no portion of the task has been accomplished, and at the ending point (106), the entire task is completed. Between the starting point (104) and the ending point (106), multiple nodes are depicted. Each of the nodes represents a type of task or sub-process. The relationship between the nodes is depicted with links. A single link (108) represents a sequential order in which the tasks are to be executed. A double link (110) represents a dependency, where tasks associated with one of the connected nodes is to be completed before the other connected node's execution task can begin. The direction of the dependency is indicated with an arrow. As demonstrated in the illustrated example, the process map (102) has tasks that are performed sequentially while other tasks can be performed in parallel.

In the example of FIG. 1, the shape of the node represents a type of task. For example, a triangular shaped node may represent a sub-workflow, a circular shaped node may represent a customized workflow, a square shaped node may represent an external workflow, another type of shaped node may represent another type of task, and so forth. While this example has been described with reference to specific shapes representing the type of task, any appropriate type of indicator may be used to represent any appropriate type of task. For example, colors, shapes, orientations, brightness, movement, flashing features, patterns, numerals, characters, symbols, or other visual indicators may be used to represent a type of task.

In response to a task being executed, the process map indicates the actual completion rate of the task's execution. The actual completion rate is the actual rate that it takes to complete the task's execution. In the example of FIG. 1, the actual completion rate is indicated by filling up an outline of the node that represents the task as the execution task is being fulfilled. For example, if the execution percentage is 25 percent completed, 25 percent of the corresponding node's outline will be filled. Likewise, if the execution percentage is 67 percent completed, 67 percent of the corresponding node's outline will he filled. Filling the node outlines may be accomplished in any appropriate manner. For example, the node's outline may fill up from its bottom as depicted in node (112). Also, the node's outline may fill up in a clockwise or counterclockwise manner as depicted in node (114). Both the actual completion percentage and the actual completion rate is depicted because a user can intuitively determine the actual complete rate based on how fast the node's outline is filling up.

While this example has been described with reference to a specific mechanism for indicating the actual completion rate of a node, any appropriate mechanism to indicate the actual completion rate may be used in accordance with the principles described herein. For example, colors, shapes, orientations, brightness, movement, flashing features, patterns, numerals, characters, symbols, or other visual indicators may be used to indicate the actual completion rate. In a specific example, a numeral may be placed nearby a node to indicate the completion percentage and/or the completion rate. In examples where the completion percentage is depicted nearby the node, the actual completion rate can be intuitively discerned by observing the speed at which the numerals representing the completion percentage advance to 100percent completion.

A time scale (116) is depicted below the nodes. In this example, the time scale (116) includes a start time (118) that correlates with the time that the process starts. Further, the time scale (116) includes markers (120) that indicate set time lapses from the starting time (118). A time slider (122) travels along the time scale (116) at an expected pace for completing the tasks as well as the overall process. As a result, as the time slider (122) advances past the horizontal position of the nodes, the tasks associated with these nodes will be complete if the actual completion rate of the tasks corresponds with the expected completion rate. Line (126) travels with the time slider (122) to aid the user in visualizing which tasks should be aligned with the expected current time.

The expected completion rate can be determined through a statistical analysis of historical data of either the entire process OR based on aggregating historical data for the individual tasks from other processes. Additionally, when there is no historical information, the expected completion rate could be setup by a designer/planner for a desired completion rate/time. For example, some of the tasks associated with the process depicted in the process map (102) may be set tasks that are applicable to other processes. As a result, the individual tasks of a particular process may not be unique to that particular process and may be reused in other processes. The execution time of a particular task may be measured and collected as historical data. The average or mean actual execution time of previous executions for a particular task may be used to determine the expected completion rate of a task. In response to a completion of a task's execution, the historical data may be updated, and the expected completion rate may be recalculated.

In the example of FIG. 1, the time slider (122) is advancing past nodes (112, 114, 124). At the moment in time depicted by FIG. 1, the task for node (124) is complete, and the tasks for nodes (112, 114) are nearly complete.

Figure 2:
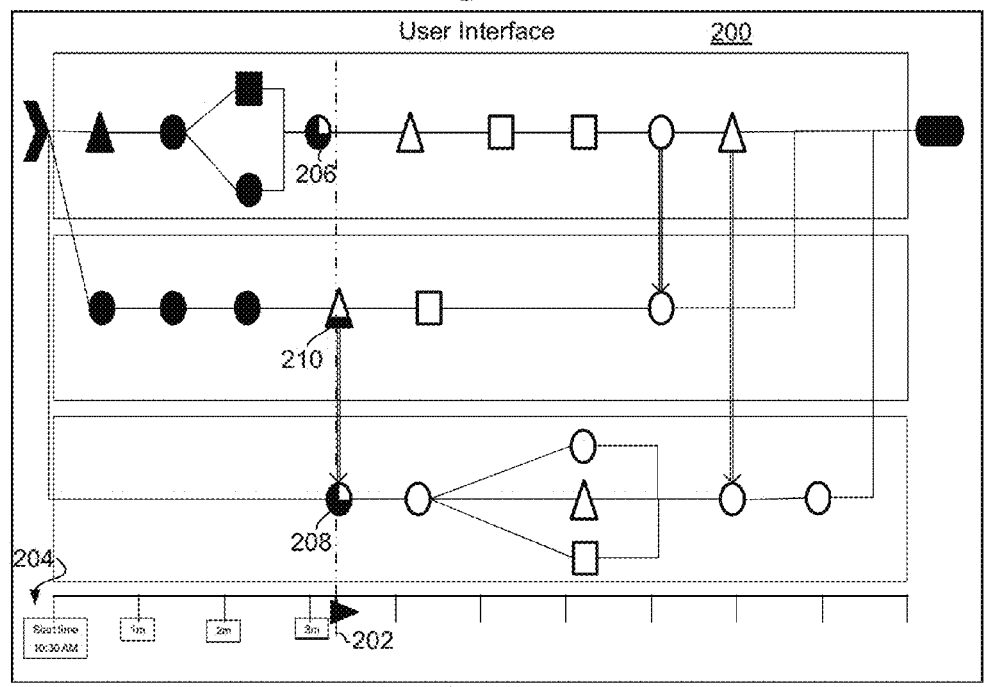
FIG. 2 is a diagram of an example of a user interface displaying a process map according to the principles described herein.

FIG. 2 is a diagram of an example of a user interface (200) displaying a process map according to the principles described herein. In this example, time has passed since the moment in time represented by the process map (102, FIG. 1) depicted in FIG. 1. Here, the time slider (202) indicates that more than three minutes has lapsed since the starting time (204) of the process. Nodes (112, 114, 124, FIG. 1) indicate that their corresponding tasks are completed. Also, the tasks associated with nodes (206, 208. 210) are currently being executed as indicated by a portion of their node's outlines being just partially filled.

Figure 3:
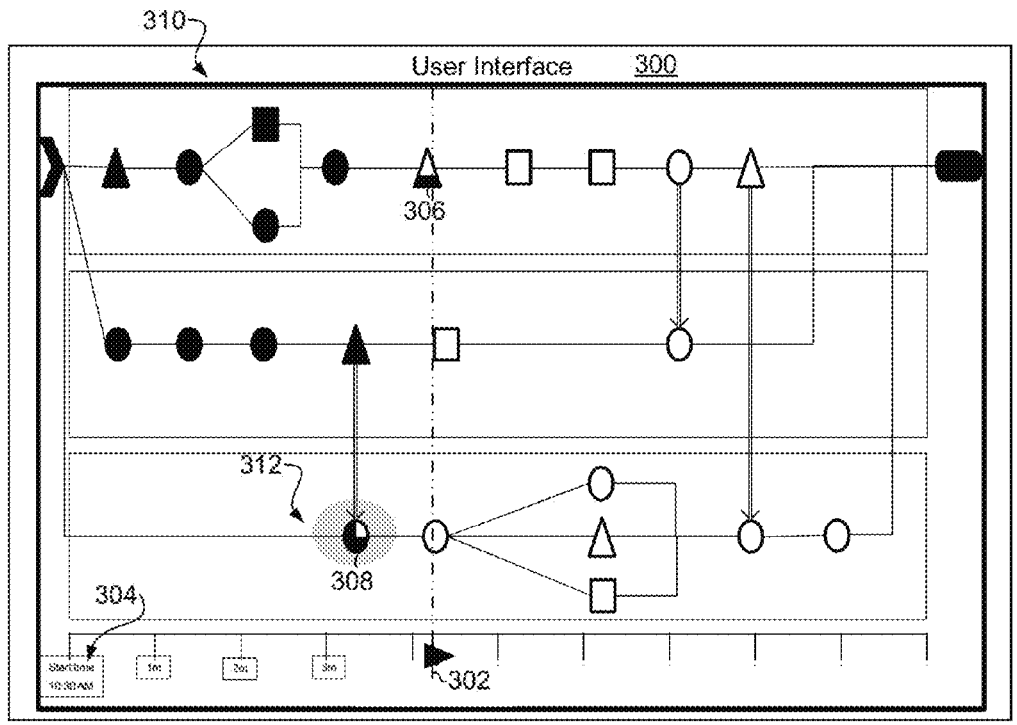
FIG. 3 is a diagram of an example of a user interface displaying a process map according to the principles described herein.

FIG. 3 is a diagram of an example of a user interface (300) displaying a process map according to the principles described herein. In this example, additional time has passed since the moment in time represented by the process map depicted in FIG. 2. Here, the time slider (302) indicates that more than four minutes has lapsed since the starting time (304) of the process. Nodes (206, 210, FIG. 2) indicate that their corresponding tasks are completed. Additionally, the task associated with node (306) has already started its execution, which is on pace with the expected completion rate. However, the task associated with node (308) is currently being executed as indicated by a portion of the node's outline being just partially filled, which is slower than the expected completion time as indicated by the position of the time slider (302). In response to being slower than the expected completion rate, the process map (310) indicates with any appropriate mechanism that the task associated with node (308) is slower than expected. In the example of FIG. 3, the indicator is a halo (312) surrounding the node (308). In other examples, colors, shapes, orientations, brightness, movement, flashing features, patterns, numerals, characters, symbols, or other visual indicators may be used to represent that the actual completion time of a node is slower than an expected completion time for that node.

The principles described herein may use a notification policy to determine when to provide a notification, such as the halo (312), to indicate that the actual completion rate of a node is slower than an expected completion rate. The notification policy may use statistical information. For example, the notification policy may have a rule that indicates that the notification will appear if an actual completion rate is at least one standard deviation slower than the tasks historically performed. In other examples, a notification may be presented in the event that any tasks are being executed slower than an average execution task. In yet other examples, the notification may be presented in response to reaching a time threshold based on the historical data. While this example has been described with reference to specific factors that may be used in the notification policy, any appropriate factor or factors may be incorporated into such a notification policy.

Further, the notification policy may include multiple types of notifications. For example, the halo (312) may turn a different color or change in some other manner as the difference between the actual completion rate and the expected completion rate becomes larger. For example, the halo (312) may turn a darker color as the actual completion rate becomes two standard deviations slower than the performance of historically similar tasks.

Figure 4:
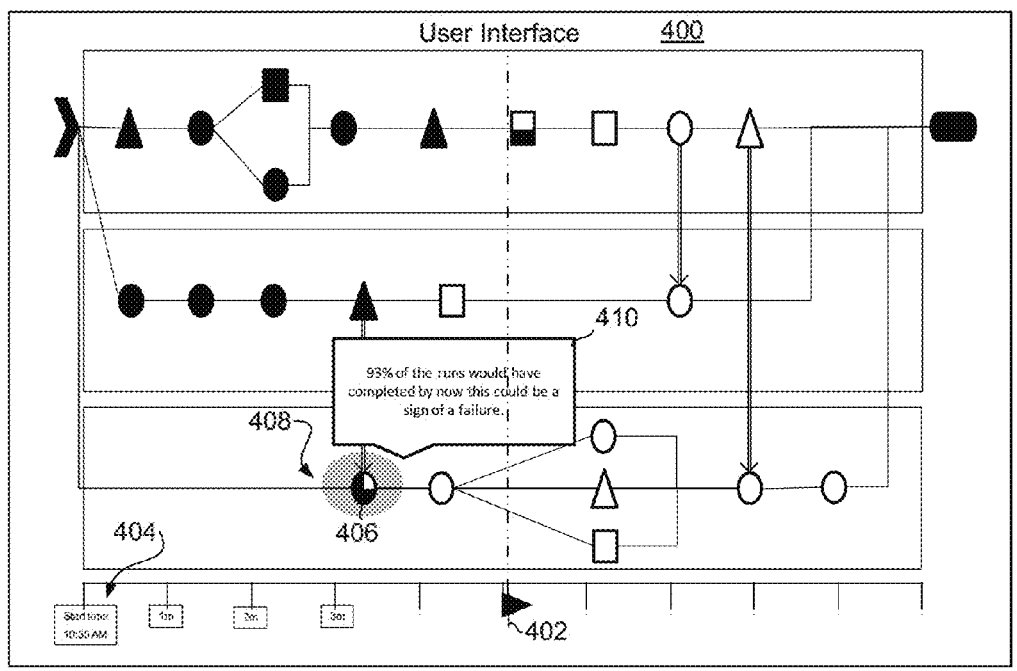
FIG. 4 is a diagram of an example of a user interface displaying a process map according to the principles described herein.

FIG. 4 is a diagram of an example of a user interface (400) displaying a process map according to the principles described herein. In this example, additional time has passed since the moment in time represented by the process map depicted in FIG. 3. Here, the time slider (402) indicates that more than five minutes has lapsed since the starting time (404) of the process. The task associated with node (406) still has not finished. In this example, the actual completion rate is being indicated as being even slower than was indicated in the example of FIG. 3 because the halo (408) is darker than halo (312, FIG. 3). However, any mechanism may be used to indicate a progressively greater difference between the actual completion rate and the expected completion rate. In some examples, there is no visual mechanism that indicates the progressively changing degree between the actual and expected completion rates.

Figure 5:
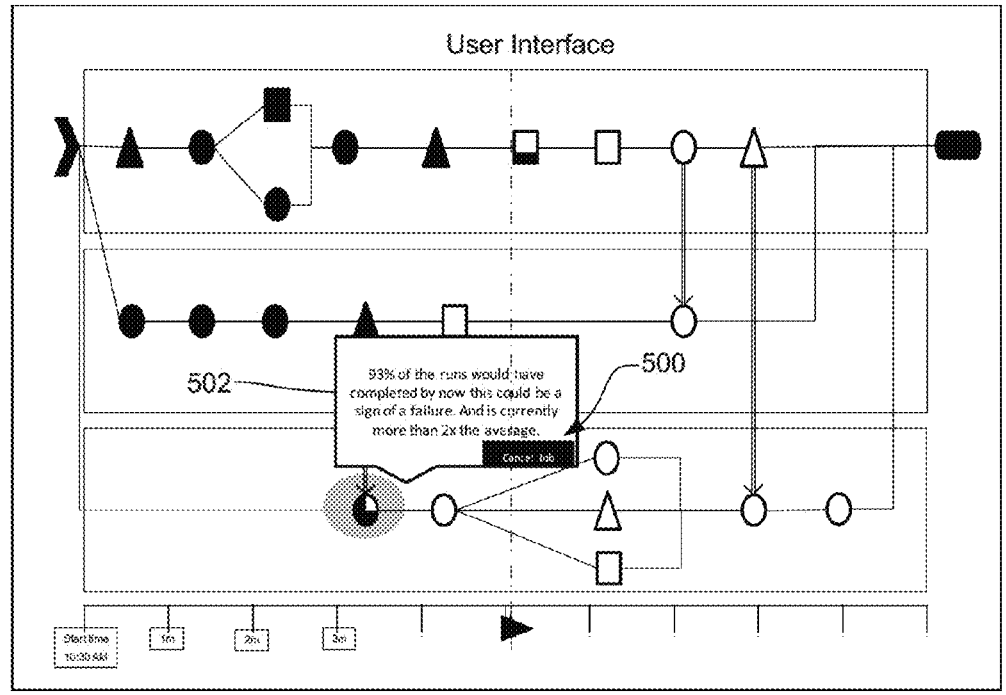
FIG. 5 is a diagram of an example of a user interface displaying a process map according to the principles described herein.

Additionally, a message box (410) is depicted in this example that describes the condition to the user. In this example, the message indicates that the difference between the actual and expected completion rates may be a sign of the task's failure to execute. In other examples, the message may provide the user with an option (500, FIG. 5) for how to proceed. For example, the message may provide an option to abort the execution of the task. In such an example, if the user selects to abort the execution task, the scripts running the process may cause the execution of the task to back out. In the example of FIG. 5, the option (500) is depicted in a "cancel job" button in the message box (502).

The message box (410) may provide different messages and/or different options than depicted in the examples of FIGS. 4 and 5. For example, the messages may include potential reasons for the slow execution time, statistical information about how slow the actual execution rate is compared to historical data, other information, or combinations thereof. Further, the options may include allowing the task to continue to execute, canceling the execution of the task, diagnosing the issues associated with executing the task, establishing communication with an expert for assistance, restarting the execution of the task and/or the process, other options, or combinations thereof.

Figure 6:
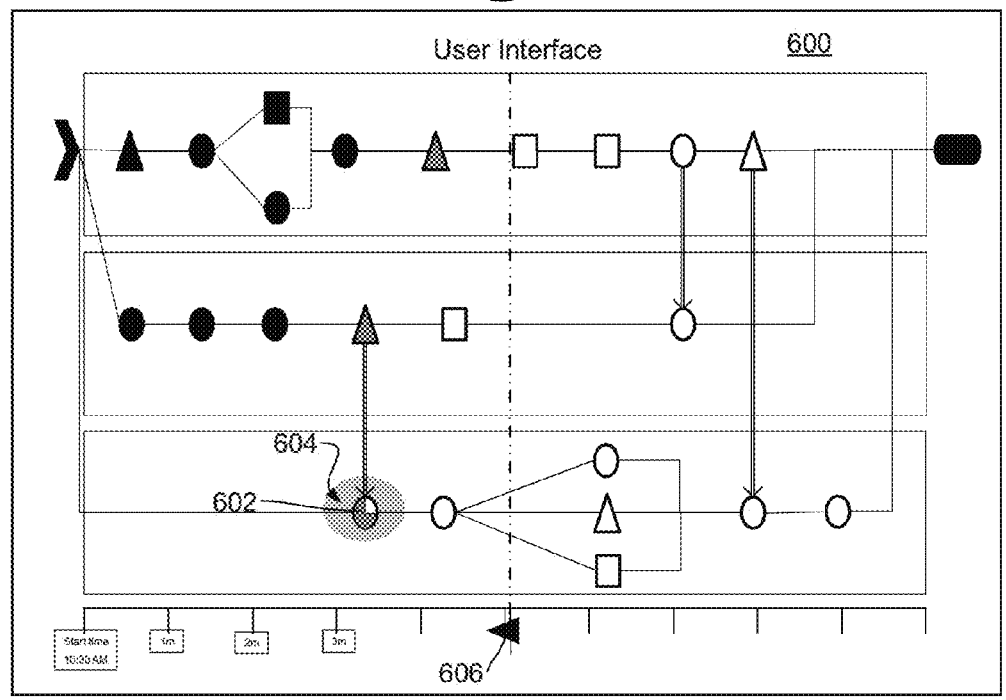
FIG. 6 is a diagram of an example of a user interface displaying a process map according to the principles described herein.

FIG. 6 is a diagram of an example of a user interface (600) displaying a process map according to the principles described herein. In this example, the fill-in color (602) of node (604) has changed to gray to indicate that the execution of the task associated with node (604) is backing-out. As the back-out execution progresses, the fill-in color occupies progressively less area within the node's outline to cause a perception to a user that the node's outline is being emptied. When the back-out execution is complete, the node's outline may appear to be entirely empty.

In some examples, an arrow (606) or another type of indicator can be used to indicate if whether a node's outline is filling up or empting out. For example, if the outline is filling up, an arrow pointing the right may indicate that a successful execution is in process. On the other hand, an arrow (606) that is pointed to the left, as shown in FIG. 6, may indicate that the task associated with that node is undergoing a back out operation.

While this example is described with reference to a specific mechanism to indicate a back-out state of a task associated with a node, any appropriate mechanism may be used. For example, colors, shapes, orientations, brightness, movement, flashing features, patterns, numerals, characters, symbols, or other visual indicators may be used to represent a back-out.

The back-out execution may occur automatically in response to reaching a predetermined time out threshold. For example, if the actual completion rate is two standard deviations slower than the expected completion rate, the scripts automating the process may cause a back-out automatically. In other examples, the back-out occurs in response to user input, such as in response to the user selecting an option to back-out. While this example has been described with specific reference to using standard deviations to trigger events, any appropriate type of metric, whether based on real time metrics or historical data, may be used to trigger such events.

Figure 7:
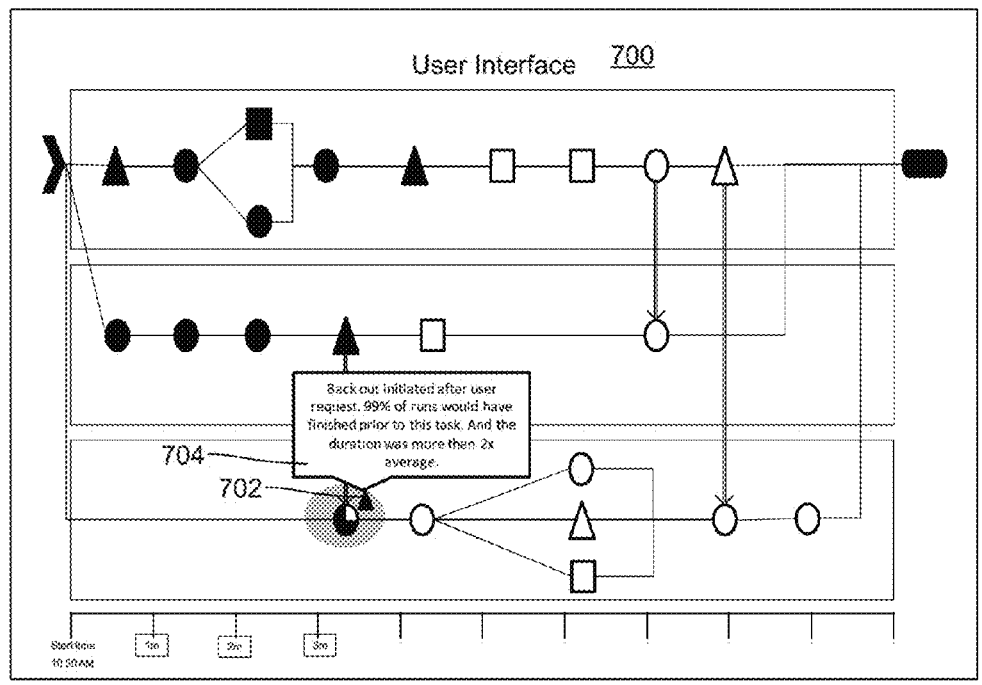
FIG. 7 is a diagram of an example of a user interface displaying a process map according to the principles described herein.

FIG. 7 is a diagram of an example of a user interface (700) displaying a process map according to the principles described herein, in this example, a back-out notification indicator (702) indicates that the actual back-out completion rate is slower than an expected back-out completion rate. The expected back-out completion rate may be calculated based on historical data in a same or similar manner as described above in regards to calculating the expected completion rate for executing tasks.

The back-out notification indicator (702) may be accompanied with a message box (704). In some examples, the user may be presented with an option for how to respond to the slow back-out rate.

While this example is described with reference to a specific back-out indicator, any appropriate indicator may be used in accordance with the principles described herein. For example, colors, shapes, orientations, brightness, movement, flashing features, patterns, numerals, characters, symbols, or other visual indicators may be used to represent a back-out indictor.

In some examples, the process map can be associated with a time scale dedicated to backing out. For example, the user may have an option to switch from the execution time scale to a back out time scale. The back out time scale may represent the expected back out time for backing out of specific tasks. In some examples, the back out scale may be displayed simultaneously with the execution time scale. Further, the back out scale may automatically appear in response to the initiation of a task back out procedure.

In some cases, the back out procedures are the reverse of the execution procedures. However, in other examples, the back out procedures are not merely the reverse of the execution procedure.

In some examples, the entire view of the process map may change to a back out view that is customized to depict the status of the process from the backing out perspective. Such a perspective may be similar to the view that depicts the execution of the tasks. A user may have an option to switch between the execution view and the back out view. In some examples, the process map automatically switches to the back out view in response to an initiation of a back out operation. In some examples, an option to switch to the back out view may appear in response to the initiation of the back out operation.

Figure 8:
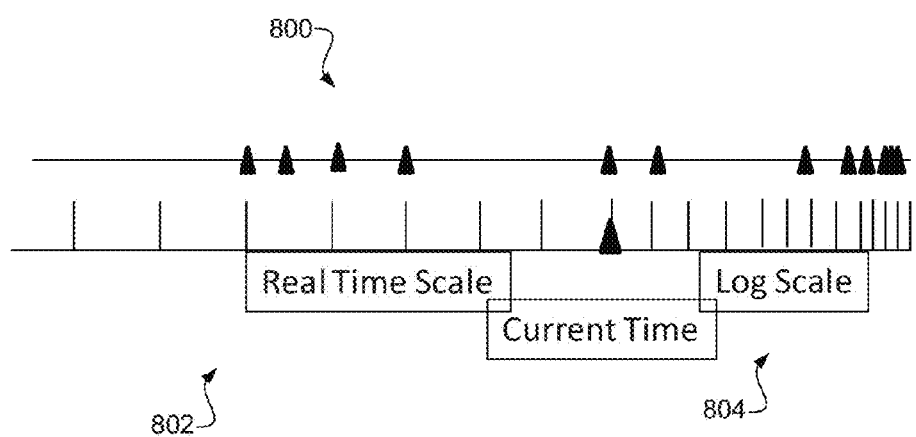
FIG. 8 is a diagram of an example of a time scale according to the principles described herein.

FIG. 8 is a diagram of an example of a time scale (800) according to the principles described herein. In this example, the time scale (800) includes an ability to adjust between a real time scale (802) and a log scale (804). Many processes that are compatible with the principles described herein may include hundreds or more nodes. As a result, it may be difficult in some examples to slow a real time scale (802) across an entire length of the process map in a meaningful way. Further, the expected execution time of each of the nodes may not be consistent across nodes. By being able to adjust the time scale (800) so that a portion of the time scale (800) is depicted in a real time scale (802) while other portions are depicted in a compressed time scale, such as the log scale (804), the user can intuitively understand the actual completion rate while still comprehending the entire timeframe for completing the overall process.

While this example depicts a compressed time scale to the right of the real time scale (802), the compressed time scale may be to the left of the real time scale (802), to the top of the real time scale (802), to the bottom of the real time scale (802), to the front of the real time scale (802), other positions or layers with respect to the real time scale (802), or combinations thereof. Further, while this example has been described with reference to specific ways to compress the time scale (800) in an intuitive manner, any appropriate mechanism for compressing the time scale may be used in accordance with the principles described herein.

Figure 9:
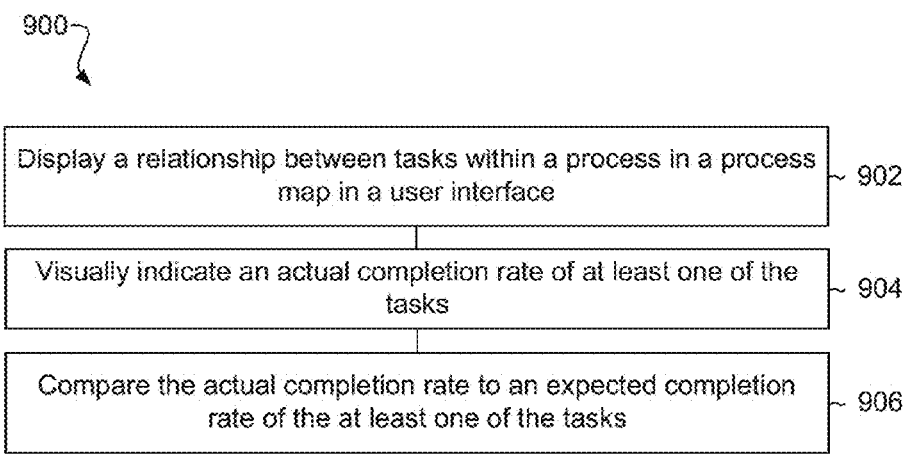
FIG. 9 is a diagram of an example of a method for tracking a status of a process according to the principles described herein.

FIG. 9 is a diagram of an example of a method (900) for tracking a status of a process according to the principles described herein. In this example, the method (900) includes displaying (902) a relationship between tasks within a process in a process map in a user interface, visually indicating (904) an actual completion rate of at least one of the tasks, and comparing (906) the actual completion rate to an expected completion rate of the at least one of the tasks.

The principles described herein allow the user to set thresholds for receiving messages or options based on the standard deviation or other time based comparison mechanisms. This aids the user in tracking the performance of the process. Using historical data to set such thresholds allows for the timeouts to be based on the established timing of deployment task execution instead of mere guess work on the user's part. By establishing initial values for base calculation with standard deviations, the system can be executed without being adversely affected outlying data points. This allows the system to narrow in on more meaningful data. By the time the system reaches production, a sufficient amount of data is used to guide the system, and realistic expectations for timing can be communicated to the user in the progress map.

Figure 10:
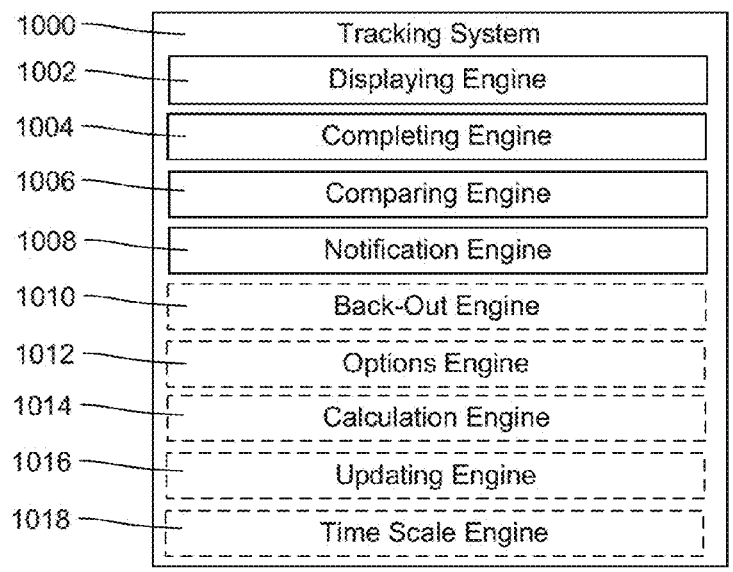
FIG. 10 is a diagram of an example of a tracking system according to the principles described herein.

FIG. 10 is a diagram of an example of a tracking system (1000) according to the principles described herein. The tracking system (1000) includes a displaying engine (1002), a completing engine (1004), a comparing engine (1006), and a notification engine (1008). In this example, the tracking system (1000) also includes a back-out engine (1010), an options engine (1012), a calculation engine (1014), an updating engine (1016), and a time scale engine (1018). The engines (1002, 1004, 1006, 1008, 1010, 1012, 1014, 1016, 1018) refer to a combination of hardware and program instructions to perform a designated function. Each of the engines (1002, 1004, 1006, 1008, 1010, 1012, 1014, 1016, 1018) may include a processor and memory. The program instructions are stored in the memory and cause the processor to execute the designated function of the engine.

The displaying engine (1002) displays the process maps. The process maps include the nodes that represent the tasks to be accomplished to run the process. The process map also depicts the relationship of the tasks. For example, the process map indicates the sequence in which the tasks can be executed, both in series and in parallel.

The completing engine (1004) causes a visual indication of the current completion percentage of a task and the completion rate at which the task is being executed. Once a task in complete, the time that it took to execute the task is recorded as part of the historical data. In response to obtaining sufficient data to make a meaningful calculation on how fast the execution of a task ought to take, the calculation engine (1014) calculates an expected completion time for that task. Since many of the tasks are repeatable sub-processes that can be incorporated into multiple processes, these calculations can be used during the execution of different processes. Even after the expected calculation times are calculated, the system continues to collect the completion times. The updating engine (1016) updates the historical records as more completion times are collected, and the calculation engine (1014) recalculates the expected completion time based on the updated historical records.

The comparing engine (1006) compares the actual completion rate of a task that is undergoing execution to the expected completion rate. The time scale engine (1018) may work with the comparing engine (1006) to depict a visual comparison between the actual completion time and the expected completion time.

In response to an indication that the actual completion time is slower than the expected completion time, the notification engine (1008) presents a notification to the user. In some examples, the notification is displayed in the display with the process map. However, any appropriate type of notification may be used. For example, the notification engine (1008) may use halos, symbols, numbers, letters, movement, messages, audible indications, visual indications, email applications, texting applications, internet applications, phone applications, tactile applications, other indicators, or combinations thereof to notify a user about the difference between the actual completion rate and the expected completion rate. In some examples, the comparing engine (1006) indicates that the actual completion rate is faster than the expected completion rate. In some examples where the actual completion rate is determined to be faster than the expected completion rate, the notification (1008) indicates to the user with an appropriate indication mechanism that the actual completion rate is determined to be faster than the expected completion rate.

An options engine (1012) provides an option for the user in response to a notification or an event. In response to user input, the system may execute the selection option provided by the options engine. In some examples, an option may be to back-out of a task that is executing at a slower rate than expected because such a slow execution rate may indicate a failure. In such an example, a back-out engine (1010) may cause the task to back-out. In other examples, a back-out engine (1010) may occur automatically in response to conditions that indicate a potential failure.

Figure 11:
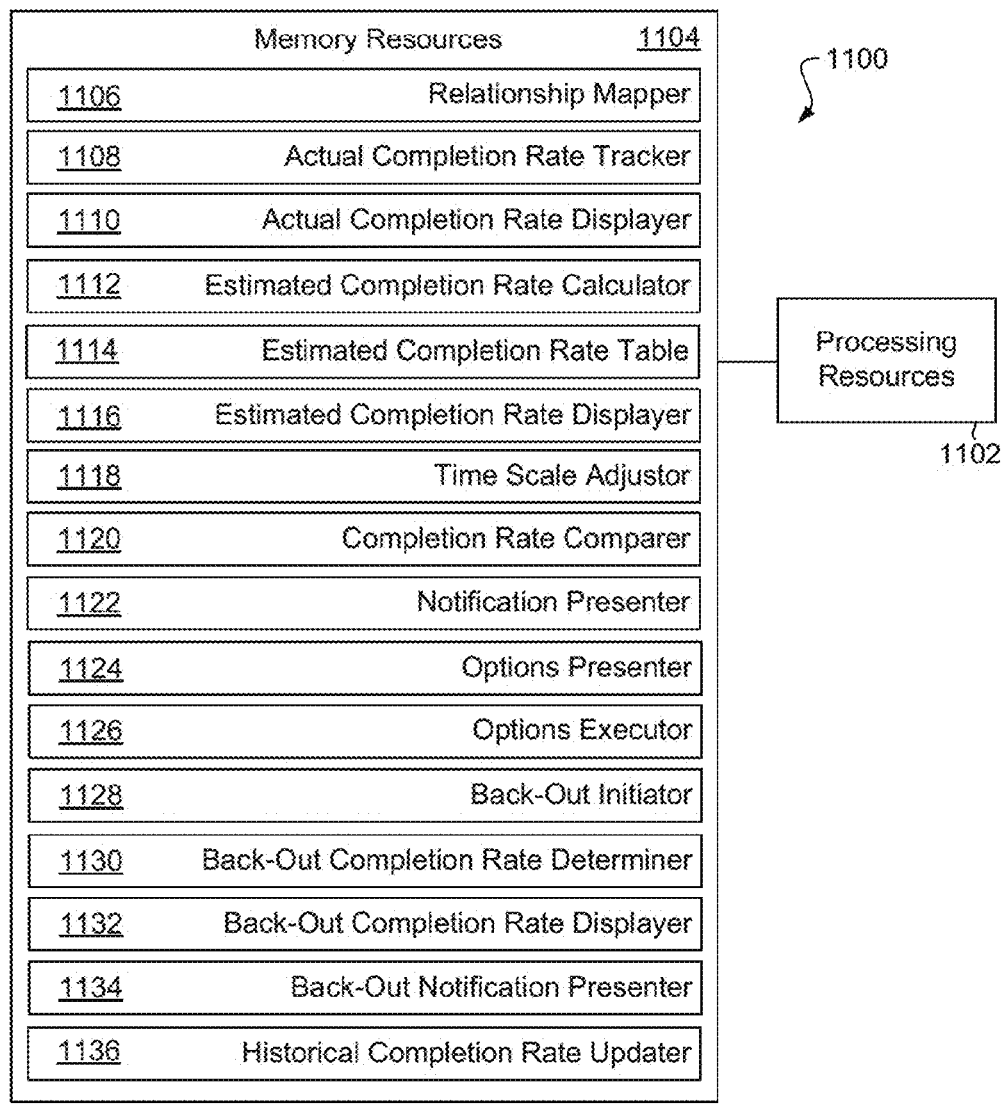
FIG. 11 is a diagram of an example of a tracking system according to the principles described herein.

FIG. 11 is a diagram of an example of a tracking system (1100) according to the principles described herein. In this example, the tracking system (1100) includes processing resources (1102) that are in communication with memory resources (1104). Processing resources (1102) include at least one processor and other resources used to process programmed instructions. The memory resources (1104) represent generally any memory capable of storing data such as programmed instructions or data structures used by the tracking system (1100). The programmed instructions shown stored in the memory resources (1104) include a relationship mapper (1106), an actual completion rate tracker (1108), an actual completion rate displayer (1110), an estimated completion rate calculator (1112), an estimated completion rate displayer (1116), a time scale adjustor (1118), a completion rate comparer (1120), a notification presenter (1122), an options presenter (1124), an options executor (1126), a back-out initiator (1128), a back-out completion rate determiner (1130), a back-out completion rate displayer (1132), a back-out notification presenter (1134), and a historical completion rate updater (1136). The data structures shown stored in the memory resources (1104) include an estimated completion rate table (1114).

The memory resources (1104) include a computer readable storage medium that contains computer readable program code to cause tasks to be executed by the processing resources (1102). The computer readable storage medium may be tangible and/or non-transitory storage medium. The computer readable storage medium may he any appropriate storage medium that is not a transmission storage medium. A non-exhaustive list of computer readable storage medium types includes non-volatile memory, volatile memory, random access memory, memristor based memory, write only memory, flash memory, electrically erasable program read only memory, magnetic storage media, other types of memory, or combinations thereof.

The relationship mapper (1106) represents programmed instructions that, when executed, cause the processing resources (1102) to map the relationships between tasks in a process. The actual completion rate tracker (1108) represents programmed instructions that, when executed, cause the processing resources (1102) to track the actual completion rate of executing a task in a process. The actual completion rate displayer (1110) represents programmed instructions that, when executed, cause the processing resources (1102) to display the actual completion rate to the user in a display in the process map.

The estimated completion rate calculator (1112) represents programmed instructions that, when executed, cause the processing resources (1102) to calculate an estimated complete rate based on the collected historical actual completion rates by task. The estimated completion rate displayer (1116) represents programmed instructions that, when executed, cause the processing resources (1102) to display the estimated completion rate, such as with a time slider in a time scale that advanced in accordance with the expected completion time. The estimated completion rate table (1114) stores the estimated completion rate for the tasks in the process.

The time scale adjustor (1118) represents programmed instructions that, when executed, cause the processing resources (1102) to adjust the time scale to compensate for an inability to show a real time scale throughout the entire process. This may be accomplished by compressing at least one portion of the time scale that does not interfere with a portion of the time scale that is currently depicting the current expected completion rate. The completion rate comparer (1120) represents programmed instructions that, when executed, cause the processing resources (1102) to compare the actual completion rate to the expected completion rate. The notification presenter (1122) represents programmed instructions that, when executed, cause the processing resources (1102) to present a notification to the user in response to determination by the completion rate comparer (1120) that the actual completion rate is off of the expected completion rate by predetermined amount.

The options presenter (1124) represents programmed instructions that, when executed, cause the processing resources (1102) to present at least one option to the user for how to respond to the notification. The options executor (1126) represents programmed instructions that, when executed, cause the processing resources (1102) to execute the option selected with user feedback. The back-out initiator (1128) represents programmed instructions that, when executed, cause the processing resources (1102) to initiate a back-out of the task. In this may occur in response to a selected option, automatically in response to a reaching the predetermined threshold, another reason, or combinations thereof.

The back-out completion rate determiner (1130) represents programmed instructions that, when executed, cause the processing resources (1102) to determine the back-out completion rate. This rate may also be determined on historical information. The back-out completion rate displayer (1132) represents programmed instructions that, when executed, cause the processing resources (1102) to display the back-out completion rate in the user interface. The back-out notification presenter (1134) represents programmed instructions that, when executed, cause the processing resources (1102) to present a notification in response to an issue with executing the back-out. The historical completion rate updater (1136) represents programmed instructions that, when executed, cause the processing resources (1102) to update the historical data on the completion rates in response to finishing the execution of a task or a back-out execution.

Further, the memory resources (1104) may be part of an installation package. In response to installing the installation package, the programmed instructions of the memory resources (1104) may be downloaded from the installation package's source, such as a portable medium, a server, a remote network location, another location, or combinations thereof. Portable memory media that are compatible with the principles described herein include DVDs, CDs, flash memory, portable disks, magnetic disks, optical disks, other forms of portable memory, or combinations thereof. In other examples, the program instructions are already installed. Here, the memory resources can include integrated memory such as a hard drive, a solid state hard drive, or the like.

In some examples, the processing resources (1102) and the memory resources (1104) are located within the same physical component, such as a server, or a network component. The memory resources (1104) may be part of the physical component's main memory, caches, registers, non-volatile memory, or elsewhere in the physical component's memory hierarchy. Alternatively, the memory resources (1104) may be in communication with the processing resources (1102) over a network. Further, the data structures, such as the libraries and may be accessed from a remote location over a network connection while the programmed instructions are located locally. Thus, the tracking system (1100) may be implemented on a user device, on a server, on a collection of servers, or combinations thereof.

The tracking system (1100) of FIG. 11 may be part of a general purpose computer. However, in alternative examples, the tracking system (1100) is part of an application specific integrated circuit.

The preceding description has been presented only to illustrate and describe examples of the principles described. This description is not intended to be exhaustive or to limit these principles to any precise form disclosed. Many modifications and variations are possible in light of the above teaching.

What is claimed is:

1. A computer program product for tracking a status of a process, comprising:
  a non-transitory computer readable storage medium that comprises program instructions that, when executed, cause a processor to:
    display a relationship between tasks within a process in a process map in a user interface, wherein displaying the relationship comprises displaying a plurality of nodes in the user interface corresponding to the tasks and displaying links in the user interface representing relationships among the plurality of nodes;
    display a time scale in the user interface associated with the process map;
    display a time slider in the user interface to move along the time scale;
    determine a pace for completing the tasks;
    automatically advance the displayed time slider in the user interface at the determined pace for completing the tasks along the time scale, wherein, for a given time for the time scale, the time slider demarcates a first set of nodes of the plurality of nodes that are expected to have been completed by the given time and a second set of nodes of the plurality of nodes that are not expected to have been completed by the given time; and
    for each node of the first set of nodes, display a visual feature co-located with the node in the user interface to visually indicate a completion status of the node.

2. The computer program product of claim 1, further comprising program instructions that, when executed, cause said processor to display in said user interface a notification that an actual completion rate is slower than an expected completion rate.

3. The computer program product of claim 2, further comprising program instructions that, when executed, cause said processor to generate said notification in response to said actual completion rate being at least one standard deviation slower than said expected completion rate.

4. The computer program product of claim 2, further comprising program instructions that, when executed, cause said processor to display an option in response to said notification.

5. The computer program product of claim 4, further comprising program instructions that, when executed, cause said processor to execute said option in response to user input.

6. The computer program product of claim 1, further comprising program instructions that, when executed, cause said processor to present said time scale in an adjustable format.

7. The computer program product of claim 1, further comprising program instructions that, when executed, cause said processor to visually indicate a back-out percentage of said tasks.

8. The computer program product of claim 1, further comprising program instructions that, when executed, cause said processor to represent a type of task of the tasks corresponding to a given node of the plurality of nodes with a shape for the given node.

9. The computer program product of claim 1, further comprising program instructions that, when executed, cause said processor to calculate an expected completion rate using historical information.

10. The computer program product of claim 9, further comprising program instructions that, when executed, cause said processor to update said historical information in response to completing a task of the tasks.

11. A system comprising:
at least one processor; and
a memory to store instructions that, when executed by the at least one processor, cause the at least one processor to:
display a relationship between tasks within a process in a process map in a user interface, wherein displaying the relationship comprises displaying a plurality of nodes in the user interface corresponding to the tasks and displaying links in the user interface representing relationships among the plurality of nodes;
display a time scale in the user interface associated with the process map;
display a time slider in the user interface to move along the time scale;
determine a pace for completing the tasks;
automatically advance the displayed time slider in the user interface at the determined pace for completing the tasks along the time scale, wherein, for a given time for the time scale, the time slider demarcates a first set of nodes of the plurality of nodes that are expected to have been completed by the given time and a second set of nodes of the plurality of nodes that are not expected to have been completed by the given time; and
for each node of the first set of nodes, display a visual feature co-located with the node in the user interface to visually indicate a completion status of the node.

12. The system of claim 11, wherein the instructions, when executed by the at least one processor, further cause the at least one processor to display a back-out rate of at least one task of the tasks in the user interface.

13. The system of claim 11, wherein the instructions, when executed by the at least one processor, further cause the at least one processor to present an option in response to a notification.

14. A method comprising:
displaying a relationship between tasks within a process in a process map in a user interface, wherein displaying the relationship comprises displaying a plurality of nodes in the user interface corresponding to the tasks and displaying links in the user interface representing relationships among the plurality of nodes;
displaying a time scale in the user interface associated with the process map;
display a time slider in the user interface to move along the time scale;
determining a pace for completing the tasks;
automatically advancing the displayed time slider in the user interface at the determined pace for completing the tasks along the time scale, wherein, for a given time for the time scale, the time slider demarcates a first set of nodes of the plurality of nodes that are expected to have been completed by the given time and a second set of nodes of the plurality of nodes that are not expected to have been completed by the given time;
for each node of the first set of nodes, displaying a visual feature co-located with the node in the user interface to visually indicate a completion status of the node; and
displaying a back-out rate of a given task of the tasks in the user interface in response to backing out of the given task.

15. The computer program product of claim 1, wherein:
a shape of a given node of the plurality of nodes represents a type of the task corresponding to the given node; and
an amount of fill within an outline of the given node represents an actual completion rate of the task corresponding to the given node.

* * * * *